(12) United States Patent
Vanspeybroeck

(10) Patent No.: US 7,999,046 B2
(45) Date of Patent: Aug. 16, 2011

(54) NEUTRALIZATION OF DEACTIVATED POLYMERIZATION CATALYST USING PHOSPHORIC OR PHOSPHONIC ACID SALTS

(75) Inventor: Rory S. L. Vanspeybroeck, Bellem (BE)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 12/305,031

(22) PCT Filed: Jun. 13, 2007

(86) PCT No.: PCT/US2007/013839
§ 371 (c)(1),
(2), (4) Date: Dec. 16, 2008

(87) PCT Pub. No.: WO2007/149274
PCT Pub. Date: Dec. 27, 2007

(65) Prior Publication Data
US 2009/0209719 A1 Aug. 20, 2009

Related U.S. Application Data

(60) Provisional application No. 60/815,131, filed on Jun. 20, 2006.

(51) Int. Cl.
*C08F 2/38* (2006.01)
(52) U.S. Cl. .......................................................... 526/82
(58) Field of Classification Search .................. 526/82
See application file for complete search history.

(56) References Cited

FOREIGN PATENT DOCUMENTS
EP 0139930 * 8/1984
* cited by examiner

*Primary Examiner* — David W Wu
*Assistant Examiner* — Sonya Wright

(57) ABSTRACT

A process for deactivating an active catalyst species in an olefin polymer stream exiting a polymerization reactor and neutralizing catalyst residues, as well as reducing corrosion, plugging or fouling of olefin production and recovery equipment and imparting antioxidative properties to an olefin polymer comprising adding a catalyst deactivator and an alkaline earth metal salt of a phosphoric- or phosphonic acid to an olefin polymer stream exiting a polymerization reactor, each in a quantity at least sufficient to deactivate active catalytic species in the polymer stream and neutralize catalyst residues, respectively, and subsequently recovering the resulting polymer product.

9 Claims, 1 Drawing Sheet

NEUTRALIZATION OF DEACTIVATED POLYMERIZATION CATALYST USING PHOSPHORIC OR PHOSPHONIC ACID SALTS

BACKGROUND OF THE INVENTION

This invention relates to a process for preparing olefin polymers using novel deactivated catalyst neutralization agents. Olefin polymers such as polyethylene and polypropylene are often produced by use of a transition metal containing polymerization catalyst thereby leaving small amounts of catalyst residues in the polymer. Such residues are typically deactivated to prevent continued polymerization outside the reactor. Deactivation of active transition metal catalysts results in generation of considerable amounts of acidic compounds and halide containing compounds such as hydrogen chloride. This can result in color body formation in the polymer and corrosion of processing equipment. Neutralization of such contaminants is generally achieved by incorporating a small quantity of an acid neutralizing compound, such as alkaline earth metal salts of a weak acid, for example a fatty acid calcium salt such as calcium stearate, into the polymer. This is normally accomplished by mixing the additive with the mixture exiting a polymerization reactor prior to devolatilization or polymer recovery.

A wide variety of catalyst deactivating agents have been utilized or disclosed in the prior art, including CO or $CO_2$, and hydroxyl or carboxyl group containing compounds such as water or water releasing compounds, optionally in combination with a non-volatile component, selected from alcohols, phenols, diols, polyols, saccharides, ethers, epoxides, aldehydes, ketones, carboxylic acids, polyacids, and acid anhydrides or esters. Suitable neutralizing compounds include amines; fatty acid salts; and salts of poly(oxyalkylene) compounds. References disclosing the foregoing compositions include EP-67,645, EP-71,252, GB-2,132,214, EP-A-140131, WO92/14766, and WO03/55920.

Disadvantageously, previous neutralizers have proven to be susceptible to decomposition or oxidation over prolonged periods. In addition, certain of the foregoing compounds, including aliphatic carboxylic acid salts or hydrolysis products thereof, are generally relatively insoluble in the polymer, resulting in decreased effectiveness. This requires use of larger quantities of additive to achieve the desired benefit, resulting in increased costs. In addition, such additives tend to separate from the polymer and migrate to the surface upon subsequent melt forming processes where they interfere with desired surface properties or esthetics of the polymer article, react with additives or other components of desired polymer blends or compositions, or plate out on processing equipment. In addition, carboxylic acid salts are relatively volatile and tend to condense within the devolatilizer and associated equipment, leading to corrosion and fouling or plugging and the need for frequent cleaning of reactor recycle and post production equipment.

Antioxidants, including phosphoric- or phosphonic acid salts, are known additives for protecting organic materials, including paints, cosmetic formulations, foodstuffs, and polymers from oxidation. Numerous such compounds and combinations of compounds are available commercially and disclosed in the art. Examples include: tris(2,4-di-tert-butylphenyl)phosphite (Irgafos™ 168), tris(nonylphenyl)phosphite, tetrakis(2,4-di-tert-butylphenyl)[1,1-biphenyl]4,4'-diylbisphosphonite (IRGANOX™ P-EPQ), and calcium bis (((3,5-bis(1,1-dimethylethyl)-4-hydroxyphenyl)methyl) ethylphosphonate) (IRGANOX™ 1425).

In general, antioxidants are a class of additives that are used to retard degradation of organic materials, formulations and natural products due to oxidation. With regard to polymers lacking the protection of antioxidants, loss of molecular weight, brittleness, discoloration, crosslinking, and deterioration of other polymer properties may occur. One mechanism of such degradation, it is believed, involves generation of free radicals, formed as a result of heat, ultraviolet radiation, mechanical shear, or impurities in the polymer. One possible pathway involves a series of reactions by means of which the free radical reacts with oxygen to form a peroxy radical, which then reacts with an available hydrogen atom of the polymer to form an unstable hydroperoxide and regeneration of a free radical. In the absence of an antioxidant, these reactions become self-propagating, and lead to polymer degradation.

Antioxidants are thought to operate according to two basic principles, referred to as primary and secondary. Primary antioxidants intercept and stabilize free radicals and peroxy radicals by donating active hydrogen atoms in preference to hydrogen atoms of the desired product. Hindered phenols and aromatic amines represent the two main types of such primary antioxidants. Secondary antioxidants prevent formation of additional free radicals by decomposing the above referenced hydroperoxides into thermally stable, non-radical, non-reactive products by means of an efficient alternative to thermolysis and generation of free radicals. Phosphites and thioesters are examples of functionality operating as a secondary antioxidant. Primary and secondary antioxidants are often used in combination, and certain compounds contain both functionalities in the same molecule, thereby combining primary and secondary antioxidizing properties into one compound.

It would be desirable if there were provided suitable additives that could be added to polymer products prior to devolatilization in order to obtain the properties of prior art acid neutralizing additives as well as anti-oxidation additives. In particular, the attainment of equivalent or improved performance in the neutralization of acidic catalyst residues with reduction or elimination of adverse consequences in their use and simultaneous incorporation of antioxidation properties in the resulting polymer is desired. Reduction of corrosion, plugging and/or fouling of devolatilization equipment and associated conveying devices due to build up of catalyst neutralization residue, while at the same time imparting antioxidant properties to the polymeric composition and elimination of some or all of the adverse consequences of conventional acid neutralizing compounds, is an achievement greatly to be desired.

SUMMARY OF THE INVENTION

The present invention provides a process for deactivating an active catalyst species in an olefin polymer stream exiting a polymerization reactor and neutralizing catalyst residues thereby additionally imparting antioxidative properties to an olefin polymer comprising adding a catalyst deactivator and an alkaline earth metal salt of a phosphoric- or phosphonic acid to an olefin polymer stream exiting a polymerization reactor, each in a quantity at least sufficient to deactivate active catalytic species in the polymer stream and neutralize catalyst residues, respectively, and subsequently recovering the resulting polymer product.

In another embodiment, the present invention provides a process for reducing corrosion, plugging or fouling of olefin production and recovery equipment while deactivating active catalyst species in an olefin polymer stream exiting a polymerization reactor and neutralizing catalyst residues, said process comprising adding to the olefin polymer stream a catalyst deactivator and an alkaline earth metal salt of a phosphoric- or phosphonic acid and subsequently recovering the resulting polymer product.

In a final embodiment, the present invention provides a process according to any one of the previous embodiments, wherein the deactivating agent and alkaline earth metal salt of a phosphoric- or phosphonic acid are combined prior to addition to the olefin polymer stream, and thereafter said combination is mixed with the olefin polymer stream, preferably by passing the mixture through one or more static mixing elements prior to recovery of the polymer product.

By use of the present phosphoric- or phosphonic acid salts as both deactivated catalyst neutralization agent and antioxidant and by adding the same prior to polymer recovery, especially prior to recovery by devolatilization, it has been discovered that products having reduced acidity can be attained compared to the use of conventional acid neutralization compositions while simultaneously imparting antioxidation properties to the polymer. Furthermore, it has been discovered that equipment fouling, plugging and corrosion are greatly reduced due to reduction of acid, especially HCl, in process recycle stream and the separate addition of a neutralizing additives or antioxidants to the polymer may be eliminated. Moreover, the resulting polymer compositions possess improved properties, especially reduced additive migration or plate-out, reduced color body formation both initially and after aging, improved electrical properties especially dielectric constant, and reduced reactivity with additives, such as pigments, colorants, dyes and light stabilizers.

DETAILED DESCRIPTION OF THE INVENTION

Figure 1:
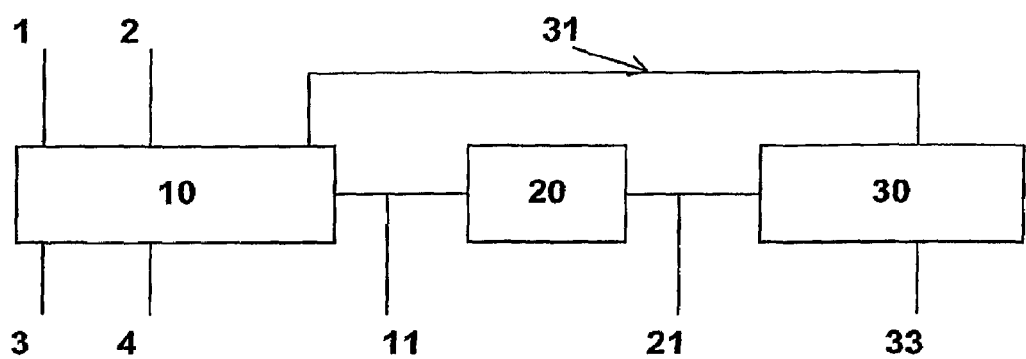
FIG. 1 is a schematic illustration of a polymerization process according to the present invention with catalyst deactivator addition occurring prior to neutralizer addition.

For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, raw materials, and general knowledge in the art. Unless stated to the contrary, implicit from the context, or customary in the art, all parts and percents are based on weight.

If appearing herein, the term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability. The term "consisting of", if used, excludes any component, step or procedure not specifically delineated or listed. The term "or", unless stated otherwise, refers to the listed members individually as well as in any combination.

The present invention preferably provides a process for producing olefin polymers, which comprises the steps of polymerizing an olefin monomer in a polymerization zone in the presence of a catalyst comprising a transition metal compound to form an olefin polymer, and adding at the end of or downstream from the polymerization zone a composition comprising an alkaline earth metal phosphonate salt as previously disclosed, and recovering the resulting polymer product, preferably by devolatilization. More preferably still, the additive composition consists essentially or wholly of the foregoing alkaline earth metal phosphonate salt.

Suitable alkaline earth metal phosphate- or phosphonate salts for use herein are compounds corresponding to the formula:

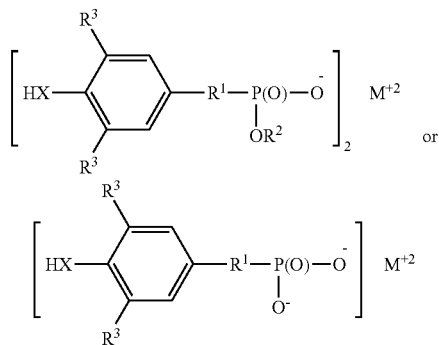

wherein,
$R^1$ is a divalent oxygen or hydrocarbylene group; preferably $C_{1-4}$ alkylene or arylene, most preferably methylene;
$R^2$ is $C_{1-4}$ alkyl, preferably ethyl;
$R^3$, individually each occurrence, is $C_{1-20}$ alkyl, preferably $C_{4-20}$ secondary or tertiary alkyl, most preferably t-butyl;
X is oxygen or sulfur, preferably oxygen; and
M is an alkaline earth metal cation, preferably $Ca^{+2}$.

Preferred compounds are the phosphonate salts. A most preferred alkaline earth metal phosphonate salt is calcium bis(((3,5-bis(1,1-dimethylethyl)-4-hydroxyphenyl)methyl) ethylphosphonate) (IRGANOX™ 1425), commercially available from Ciba Corporation.

Olefin polymers for use herein include any polymer formed by addition. polymerization of one or more olefins, especially homopolymers and interpolymers of one or more $C_{2-10}$ α-olefins. Examples include homopolymers of ethylene, propylene, 1-butene or 4-methyl-1-pentene; interpolymers of ethylene with one or more $C_{3-10}$ α-olefins or styrene; interpolymers of two or more $C_{3-10}$ α-olefins; interpolymers of ethylene, one or more $C_{3-10}$ α-olefins and optionally styrene or a $C_{4-20}$ diolefin; and interpolymers of one or more $C_{3-10}$ α-olefins with styrene, a $C_{4-20}$ diolefin or a mixture of styrene with a $C_{4-20}$ α-olefin. Suitable interpolymers include block or random copolymers containing multiple monomer remnants in each polymer chain; graft copolymers containing polymer segments of one or more monomers pendant from a separately prepared polymer; and copolymer blends containing mixtures of individual polymer components, such as blends comprising a matrix of a relatively crystalline polymer component with occlusions or domains of a relatively rubbery polymer or homogeneous blends of two or more olefin polymers.

Preferred olefin polymers for use herein are isotactic polypropylene, low density polyethylene (LDPE), linear low density polyethylene (LLDPE), and high density polyethylene (HDPE). Highly preferred olefin polymers are LLDPE resins made by copolymerizing ethylene with one or more $C_{3-10}$ α-olefins, especially 1-butene, 1-hexene or 1-octene by use of a transition metal containing catalyst. Preferably, the polymers have a density from 0.85 to 0.98 g/cc, more preferably from 0.87 to 0.95 g/cc, and a weight average molecular weight (Mw) from 60,000 to 200,000.

Highly preferred olefin polymers are prepared by use of a catalyst comprising one or more transition metal derivatives and a cocatalyst or activator. Suitable transition metals are metals from groups 3-10 of Periodic Table of Elements. Examples of suitable compounds include titanium halides, vanadium halides, vanadium oxyhalides and the like or oxides, such as chromium trioxide, molybdenum trioxide, and the like. Also mixed oxy halides, hydrocarbyloxides, mixed halides and hydrocarbyloxides are advantageously used. As the cocatalyst or activator, there may be employed an organic aluminum compound such as trialkyl aluminum, dialkyl aluminum chloride, mixed orgaonaluminum-magnesium complexes or polymeric or oligomeric aluminum oxyalkoxides, such as methylalumoxane.

Suitable catalysts include both Ziegler-Natta catalysts and Phillips-type catalysts as well as complexes containing a transition metal having at least one delocalized -electron containing ligand or electron donor ligand. Suitable compounds include metallocenes, half metallocenes, constrained geometry catalysts, single site catalysts, and post-metallocenes or donor complexes, the synthesis and use of which are well known to the skilled artisan.

Preferably, the olefin polymers employed in the present invention are prepared by use of a catalyst composition comprising halogen, a transition metal of Groups 3-6 of the Periodic Table of Elements, and optionally magnesium and/or an alkoxide; and an organoaluminum cocatalyst, specifically a Ziegler-Natta or Phillips type catalyst.

The process of the present invention can be carried out in conjunction with any of several different polymerization techniques. Suitable techniques include bulk polymerization, suspension polymerization, slurry polymerization, gas phase polymerization, solution polymerization, and high-pressure polymerization. Representative of such techniques is, for example, the solution polymerization method in which one or more olefins are polymerized in the presence of an inert hydrocarbon solvent at an average polymerization temperature above the softening point and preferably above the melting point of the resulting polymer, typically from 80 to 300° C., preferably from 100 to 300° C., most preferably from 130 to 275° C. The polymerization pressure typically is from 1 to 10 MPa. Illustrative of the high temperature, high pressure polymerization method using a transition metal catalyst is one wherein ethylene or a mixture of ethylene with one or more α-olefins is polymerized by feeding a transition metal polymerization catalyst at a polymerization temperature of 130 to 300° C. under a polymerization pressure of 10 to 300 Ma. Inert hydrocarbon diluents to be used in the solution or slurry polymerization techniques include butane, pentane, hexane, cyclohexane, heptane, octane, isooctane, nonane, decane, dodecane and mixtures thereof. Hydrogen or other chain transfer agents and polymerization temperature are typically used for controlling molecular weight of the olefin polymer.

In the process of the present invention multiple polymerization steps may be carried out in sequential or parallel polymerization zones, each employing the same or a different type of catalyst. The present neutralizing composition can be used in some or all of the polymerization steps, however, desirably the polymer is not recovered until after exiting the final polymerization, whereupon a combined polymer product stream is recovered. U.S. Pat. No. 5,869,575 describes a polymerization processes for preparing polymer compositions of controlled composition and molecular weight distributions, wherein at least one homogeneous polymerization catalyst and at least one heterogeneous polymerization catalyst in separate reactors connected in series or in parallel is used.

According to a preferred process, ethylene and optionally another olefin are polymerized in a solution process under solution polymerization conditions in at least one reactor containing a heterogeneous or homogeneous catalyst composition, and sequentially this polymer solution is passed into at least one other reactor containing a heterogeneous Ziegler catalyst, ethylene and optionally another alpha-olefin under solution polymerization conditions to form an additional polymer, and solvent is removed from the polymer solution and the polymer composition recovered. The homogeneous catalysts employed are desirably metallocene or post metallocene compounds as aforementioned.

According to the present invention, the catalyst deactivation composition is added at the end of the polymerization zone or downstream from the polymerization zone. The reaction mixture emerging from the polymerization reactor or zone after completion of polymerization contains an olefin polymer, unaltered monomers, the polymerization catalyst, a part of which may still be active, and optionally an inert hydrocarbon diluent or solvent, when such a diluent or solvent is employed. Suitable deactivation agents or catalyst "kill agents" include water, water releasing agents, CO, $CO_2$, alcohols or other suitable agent previously disclosed in the art. A most preferred catalyst kill agent is water.

In order to render the transition metal catalyst or its decomposition products inert after the polymer has been formed, the phosphoric- or phosphonic acid salt is mixed with the reaction mixture simultaneously with or subsequent to addition of the kill agent, and at a time prior to entering the devolatilizer or other recovery equipment. As previously mentioned, in a preferred embodiment the catalyst deactivation agent and the present phosphoric- or phosphonic acid salt are preferably combined prior to addition of the resulting solution or dispersion to the polymer stream exiting the polymerization reactor. Suitable contacting times are selected to provide substantially complete catalyst deactivation and neutralization of acid species, preferably from 1 second to 10 minutes. Mixing may be practiced at a location which may be either before, at, or after the outlet of the polymerization zone, typically formed by a reducing valve, if any, situated between the polymerization zone and the polymerization finishing steps, such as a polymer separator. As to the method for mixing, the polymer process stream and the present neutralizer/antioxidant stream may be simply mixed by combining the two streams into one stream. Alternatively, any other method may be available, so long as the catalyst components or their decomposition products can be rapidly contacted with the present composition. It has been found advantageous to employ forced mixing means, such as one or more static mixers or in-line mixers, if sufficient mixing of the product stream and additive stream are not inherently obtained prior to polymer recovery.

Separation of the polymer from unreacted monomer and optional solvent or diluent is typically done by elevating the temperature or decreasing the pressure of the mixture, or both, to flash off the monomer and diluent. There can be one or two or more of such separation steps in sequence. In the process, the neutralized catalyst residue as well as the present phosphoric- or phosphonic acid salt or their combined reaction products, remain within the molten polymer stream whereas the unreacted monomers, diluent and other gases are removed therefrom. In continuous processes, the unreacted monomers, any diluent and other gasses may be separated, optionally purified, and recycled into the process again, if desired. Significantly, entrainment of neutralized catalyst residue, or unreacted neutralizer, specifically fatty acid salts, in the recycle stream is substantially reduced according to the present invention.

The phosphoric- or phosphonic acid salt is simply mixed with the polymer stream by combining the same either in neat form or as a solution or dispersion in an inert diluent with the polymer stream before devolitilization. By using phosphoric- or phosphonate acid salts according to the present preferred embodiments, that are partly or fully soluble in water, the compound can be added in combination with the preferred kill agent, water. In this manner, the aqueous component acts as the catalyst kill and the phosphoric- or phosphonic acid salt simultaneously neutralizes any acidic by-products. Suitable aqueous dispersions or solutions comprise from 0.1 to 60 percent phosphoric- or phosphonic acid salt by weight.

The process of the present invention may be further illustrated by reference to the accompanying figures. In FIG. 1 there is depicted in schematic form a polymerization process including a reactor unit 10, having associated monomer supply 1, solvent supply 2, catalyst supply 3, and cocatalyst supply 4. It is understood that multiple reactors may comprise the reactor unit. Polymer containing reaction mixture exits the reactor unit and is combined with catalyst deactivator from supply 11, before entering mixer unit 20, preferably comprising one or more static mixers. After exiting the mixer unit, neutralizer/antioxidant from supply 21 is combined with the reaction mixture and the resulting admixture supplied to devolatilizer unit, 30. Volatile components of the reaction mixture are separated by the devolatilizer unit, which may comprise one or more stages, are recovered and conveyed to the reactor unit 10 by conduit 31. Recovered polymer product containing deactivated and neutralized catalyst residue and antioxidant is removed at the discharge, 33. Other additives, such as one or more stabilizers or additional antioxidants, may also be charged from supply 21.

Figure 2:
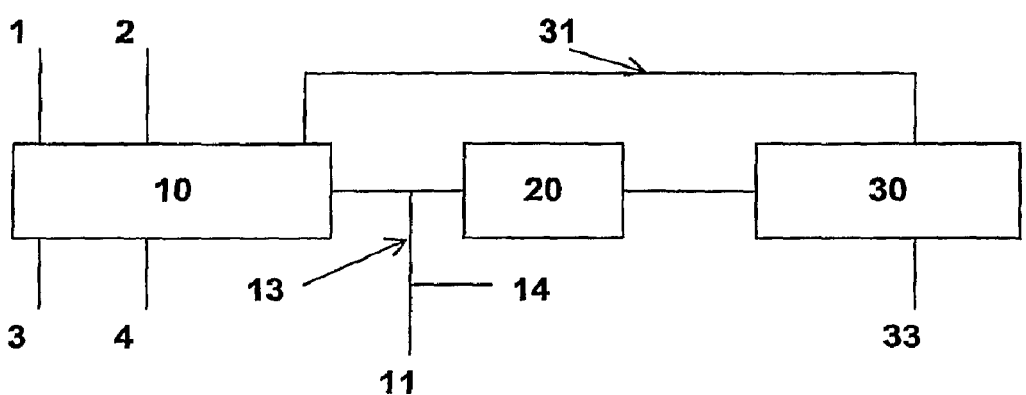
FIG. 2 is a schematic illustration of a polymerization process according to the present invention with catalyst deactivator addition and neutralizer addition occurring simultaneously.

In FIG. 2 there is depicted a similar polymerization process including a reactor unit 10, having associated monomer supply 1, solvent supply 2, catalyst supply 3, and cocatalyst supply 4. Polymer containing reaction mixture exits the reactor unit and is combined with the combined stream 13, resulting from mixing catalyst deactivator from supply 11 and neutralizer/antioxidant from supply 14, before entering the mixer unit 20. After exiting the mixer unit, the resulting admixture is supplied to devolatilizer unit, 30. Volatile components of the reaction mixture are separated by the devolatilizer unit, recovered and conveyed to the reactor unit 10, by conduit 31. Recovered polymer product containing deactivated and neutralized catalyst residue and antioxidant is removed at the discharge, 33. Other additives, such as stabilizers or one or more additional antioxidants, may also be charged from supply 14.

The resultant olefin polymer may be compounded with conventional additives such as stabilizers, UV-absorbers, antistatic agents, antiblocking agents, lubricants, pigments, inorganic or organic fillers, fire-retardant compounds, anti-drip agents, or additional polymers such as rubbers or fluorinated polymers, especially fluoroelastomers, optionally in combination with an interfacial agent such as a poly(oxyalkylene) polymer. Normally such additional additives are desirably added in one or more subsequent compounding processes, however, addition of one or more such additives simultaneously with addition of the present catalyst neutralization and antioxidant agent may be employed without departing from the scope of the present invention. Reduced interaction or interference with such additives or agents is achieved according to the present invention. Highly preferably, the present phosphonate salt is the only antioxidant added to the polymer. Because it is added to the polymer stream exiting the polymerization reactor, thorough incorporation of the antioxidant is achieved, at the earliest point possible in the polymer process, thereby reducing polymer degradation during recovery stages and achieving thorough, homogeneous, incorporation of the antioxidant in the resulting polymer. Remelting the polymer in order to incorporate antioxidant, with concomitant polymer degradation and energy consumption, is thereby avoided.

The polymers obtained according to the present invention are suitable for many types of applications, including those that require excellent optical properties and high stretch ratios, such as fiber spinning applications, injection molding, blow molding, rotomolding, and blown or cast film applications. In addition, the polymers possess improved dielectic properties, making them suitable for wire and cable insulating or jacketing applications.

The following enumerated specific embodiments are provided as enablement for the appended claims:

1. A process for deactivating an active catalyst species in an olefin polymer stream exiting a polymerization reactor and neutralizing catalyst residues and imparting antioxidative properties to an olefin polymer comprising adding a catalyst deactivator and an alkaline earth metal salt of a phosphoric- or phosphonic acid to an olefin polymer stream exiting a polymerization reactor, each in a quantity at least sufficient to deactivate active catalytic species in the polymer stream and neutralize catalyst residues, respectively, and subsequently recovering the resulting polymer product.

2. A process for reducing corrosion, plugging or fouling of olefin production and recovery equipment while deactivating active catalyst species in an olefin polymer stream exiting a polymerization reactor and neutralizing catalyst residues, said process comprising adding to the olefin polymer stream a catalyst deactivator and an alkaline earth metal salt of a phosphoric- or phosphonic acid and subsequently recovering the resulting polymer product.

3. A process according to any one of embodiments 1 or 2, wherein the deactivating agent and alkaline earth metal salt of a phosphoric- or phosphonic acid are combined prior to addition to the olefin polymer stream, and thereafter said combination is mixed with the olefin polymer stream, preferably by passing the mixture through one or more static mixing elements prior to recovery of the polymer product.

4. A process according to any one of embodiments 1-3 wherein the phosphoric- or phosphonic acid salt corresponds to the formula:

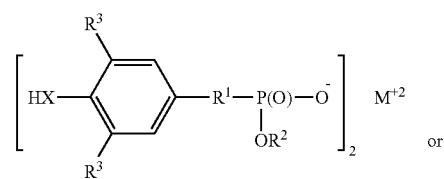

or

-continued

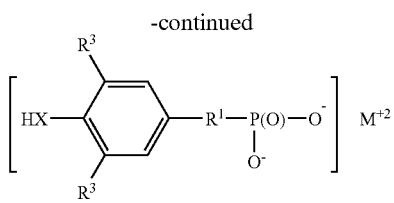

wherein, $R^1$ is a divalent oxygen or hydrocarbylene group; preferably $C_{1-4}$ alkylene or arylene, most preferably methylene;

$R^2$ is $C_{1-4}$ alkyl, preferably ethyl;

$R^3$, individually each occurrence, is $C_{1-20}$ alkyl, preferably $C_{4-20}$ secondary or tertiary alkyl, most preferably t-butyl;

X is oxygen or sulfur, preferably oxygen; and

M is an alkaline earth metal cation, preferably $Ca^{+2}$.

5. The process according to any one of embodiments 1-4 wherein calcium bis(((3,5-bis(1,1-dimethylethyl)-4-hydroxyphenyl)methyl)-ethylphosphonate) is added to the polymer stream.

6. The process according to any one of embodiments 1-5 wherein the olefin polymer is a homopolymer of ethylene or propylene or a copolymer of ethylene with one or more $C_{3-10}$ α-olefins prepared by use of a transition metal containing catalyst composition.

7. The process according to any one of embodiments 1-6 wherein the catalyst composition comprises halogen, a transition metal of Groups 3-6 of the Periodic Table of Elements, and optionally magnesium and/or an alkoxide; and an organoaluminum cocatalyst.

8. The process according to any one of embodiments 1-7 wherein an aqueous solution containing from 0.1 to 60 percent phosphoric- or phosphonic acid salt is employed as the catalyst deactivator and neutralizer.

9. The process according to any one of embodiments 1-8 wherein the polymer stream, catalyst deactivator and alkaline earth metal salt are mixed by passing through one or more static mixing elements prior to recovery of the polymer.

10. The process according to any one of embodiments 1-9 wherein the polymer is recovered by devolatilization.

11. A polymeric composition obtained by the process of any one of embodiments 1-10.

The invention is further illustrated by the following examples that should not be regarded as limiting of the present invention. Unless stated to the contrary or conventional in the art, all parts and percents are based on weight.

EXAMPLES

An ethylene/1-octene polymer is prepared in two continuous stirred tank reactors (CSTR's) of 5 liters volume each operated in series. The reactors are equipped with a shell to keep the reactor volume at adiabatic conditions. The feed to the first reactor comprises a mixture of $C_{8-10}$ n-alkane containing 20 percent ethylene which is charged at a rate of 30 kg/hr. The temperature of the solvent/ethylene feed is 15° C. and the pressure is maintained at 3.5 MPa. 1-Octene is added as a separate stream into the first reactor. By an additional separate stream, fresh solvent, a Ziegler-Natta procatalyst comprising a suspension of a $MgCl_2$ supported $TiCl_4$ in the same n-alkane mixture is injected into the first reactor at a rate of about 0.01 g Ti/hr. The procatalyst is prepared essentially according to the procedure of U.S. Pat. No. 4,547,475 and contains Mg/Cl/Al/Ti in the mole ratios 13/35/4/1. Together with the procatalyst, triethylaluminum cocatalyst is fed in an amount of 3.5 mole of Al per mole of Ti. During the subsequent polymerization of the ethylene/octene mixture, approximately 80 percent of the ethylene is converted and the reactor temperature increases to 180° C. The reaction mixture comprising dissolved polymer enters into the second reactor where approximately 10 percent additional ethylene is converted, increasing the reaction temperature to 200° C. at a pressure of 3.5 MPa. About 5.2 kg polymer per hour is formed having a melt index of 3.0 (ASTM-D-1238 Procedure A, Condition E at 190° C./2.16 kg) and a density of 0.914 g/cm³ and containing about 12 percent polymerized 1-octene.

After the product stream containing polymer, monomer, solvent and catalyst leaves the second reactor, 20 ppm, based on polymer loading, of water in the form of a 1000 ppm solution in $C_{8-10}$ n-alkane solvent, is added at a pressure of 4.0 MPa and a temperature of 150° C. The ensuing mixture is passed through a static mixer for 10 seconds followed by addition of phosphonic acid salt (calcium bis(((3,5-bis(1,1-dimethylethyl)-4-hydroxyphenyl)methyl)ethylphosphonate) (Irganox™ 1425 from Ciba Corporation) (I-1425) and sufficient bis(1,2,2,6,6,-pentamethyl-4-piperidinyl) sebacate (Irgafos™ 168, also from Ciba Corporation, I-168, to give 1000 ppm in the devolatilized polymer.

The product stream is then heated to 250° C. at 3.5 MPa and devolatilized in a two stage devolatilization process. The first stage operates at 1.5 MPa and 200° C. after which the polymer stream is reheated to 250° C. and passed into a flash vessel where remaining solvent is removed under vacuum. HCl content in the unreacted ethylene vent exiting the devolatilizer is determined once steady state operating conditions are attained. The resulting molten polymer stream then passes through a melt forming die and cutter, and is cooled in a water bath to give solid pellets, having a residual solvent content of 0.2 percent. The polymerization is discontinued after producing about 25 kg of polymer.

In the comparative experiment, calcium stearate (CaSt) containing 3 percent water in the form of a 9 percent suspension in $C_{8-10}$ n-alkane solvent is injected prior to passing the mixture through an in-line static mixer. Two hindered phenol antioxidants, n-octadecyl 3,5-bis(1,1-dimethylethyl)-4-hydroxyphenyl)ethanoate (Irganox™ 1076 from Ciba Corporation) (I-1076) and 1,6-hexamethylene-bis(3,5-di-t-butyl-4-hydroxyhydrocinnamate) (Irganox™ 1010 from Ciba Corporation) (I-1010) and I-168 (1000 ppm) are added at the same time.

The polymer products thus produced are subjected to HCl measurements in the vapor phase above the die during extrusion. Extrusion experiments are conducted on a laboratory scale APV Baker MP19TC co-rotating twin screw extruder with 19 mm screw diameter and barrel length of 40 D. The temperature profile in zones 1 to 7 is 170° C. to 230° C. with increments of 10° C., the die temperature is 240° C. and melt temperatures are between 248° C. and 251° C. The extruder is operated at 300 rpm, torque between 57 and 74 percent, and an output between 2.9 and 3.1 kg/hr. Samples are collected by suction using Drager tubes with a sensitivity range of 1-10 ppm/liter of sample volume. Samples taken during extrusion are collected over 20 minutes at a flow rate of 520 ml/min, with the Drager tube inlet located 0.7 cm above the die opening (P-HCl). Measurements of the ethylene vent gas are also determined by use of Drager tubes at a flow rate of 520 ml/min until a value of 10 ppm or a maximum sample time of 5 minutes is reached. The recorded values are normalized for 1 liter of sample gas.

Aluminum cylindrical receptacles (7.5 cm high, 2.2 cm diameter) containing about 25 g of polymer are heated under nitrogen to 225° C. until the polymer is molten. Mild steel coupons (5 cm×1 cm×1 mm, Nalco, Inc., Part number:

P5071, pretreated by filing the surface, contacting with hexane for 5 minutes, then with acetone for another 5 minutes, and drying) are inserted vertically into the molten polymer in each receptacle. Two reference coupons are subjected to the same procedure and placed into empty receptacles. After 24 hours the coupons are removed with pliers and the polymer is removed from the surface with a spatula. The surface of the coupons ($S_{exp}$) that has been in contact with the polymer sample is measured using a caliper gauge and the coupon is weighed ($W_0$) in an analytical balance. The non-exposed reference coupons are also weighed ($W_{0nexp}$). The coupons are then suspended above the surface of water in a sealed glass container (moisture chamber) at room temperature taking care that the coupons do not touch the walls of the container. After 24 hours, the coupons and reference coupons are weighed again ($W_{24}$ and $W_{24nexp}$ respectively). The weight gained by the coupons compared to the reference coupons is related to the corrosion and the corrosion index (CI) expressed in g/m² is calculated as follows:

$$CI = \frac{W_{24} - W_0}{S_{exp}} - CI_0\left(\frac{h_t - h_{exp}}{h_t}\right)$$

wherein: $CI_0$ is the corrosion index for the reference coupons calculated as follows:

$$CI_0 = \frac{W_{24n\,exp} - W_{0n\,exp}}{S}$$

$W_{24}$ is the weight (g) of the exposed coupon after 24 hours in moisture conditions;
$W_0$ is the weight (g) of the exposed coupon after 24 hours in contact with polymer;
$S_{exp}$ is the surface area (m²) of the coupon in contact with the polymer;
$h_t$ is the total height (mm) of the coupon;
$h_{exp}$ is the height (mm) of the part of the coupon in contact with polymer;
$W_{24nexp}$ is the weight (g) of reference coupon after 24 hours in moisture conditions;
$W_{0nexp}$ is the weight (g) of reference coupon after 24 hours inside the oven before exposure to moisture; and
S is the total surface area (m²) of the reference coupon.

The corrosion index is the mean of three separate measurements for each sample. A rating of 0.0 indicates no corrosion and the higher the number, the greater the severity of corrosion. Standard deviation (StD) for the samples is also calculated.

Color formation initially and after 10 days exposure to $NO_2$ (gas fading) is determined by exposing molded plaques to 4-6 ppm $NO_2$ at 60° C. and 87 percent relative atmospheric humidity for 10 days in accordance with AATCC 164. Plaques (5 cm×10 cm×1 mm) are compression molded at 130° C. and 1.0 MPa for 3 minutes then 15 MPa for 3 minutes. The samples are placed on a rotating rack in the gas fading oven at 60° C. The CIE color coordinates are determined in accordance with ASTM D 1925-77. The change in CIE color coordinates is an indication for the gas fading resistance. An increase (less negative) b value represents yellowing. Small increases in b value denote little yellowing.

Results are contained in Table 1.

TABLE 1

| Ex. | Neutralizer (ppm) | I-1076 ppm | I-1010 ppm | R-HCl ppm | P-HCl ppm | CI (StD) | 0 day b | 10 day b |
|---|---|---|---|---|---|---|---|---|
| A* | CaSt (1250) | 250 | 200 | 3.8 | 1.0 | 0.42 (0.18) | −9.3 | −3.6 |
| 1 | I-1425 (1000) | 0 | 0 | 0 | 0.9 | 0.11 (0) | −9.8 | −7.3 |
| 2 | I-1425 (750) | 0 | 0 | 3.5 | 0.0 | 0.17 (0.06) | −9.6 | −7.3 |
| 3 | I-1425 (500) | 0 | 0 | 2.2 | 0.5 | 0.31 (0.18) | −9.7 | −7.3 |

*comparative, not an example of the invention

The foregoing results indicate that practice according to the invention results in substantial reduction of acidic by-products, primarily HCl, both in the product and in the recycle stream with an associated reduction in corrosion index for the polymer. In addition, color body formation, as determined by color b measurements after gas fading, is substantially reduced. These results indicate that in addition to antioxidation properties, the single component additive according to the invention, also achieves neutralization of residual acidic catalyst components, primarily HCl. By adding the phosphonic acid salt antioxidant prior to devolatilization, substantial reduction of recycle acid content is also achieved, thereby greatly reducing corrosive properties of the recycle stream.

What is claimed is:

1. A process for deactivating an active catalyst species in an olefin polymer stream exiting a polymerization reactor and neutralizing catalyst residues and imparting antioxidative properties to an olefin polymer comprising adding a catalyst deactivator and an alkaline earth metal salt of a phosphoric- or phosphonic acid to an olefin polymer stream exiting a polymerization reactor, each in a quantity at least sufficient to deactivate active catalytic species in the polymer stream and neutralize catalyst residues, respectively, and subsequently recovering the resulting polymer product;

wherein the phosphoric- or phosphonic acid salt corresponds to the formula:

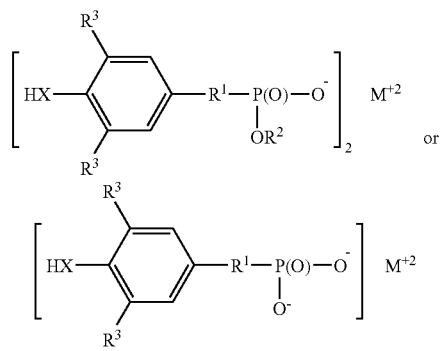

wherein,
$R^1$ is a divalent oxygen or hydrocarbylene group;
$R^2$ is $C_{1-4}$ alkyl;
$R^3$, individually each occurrence, is $C_{1-20}$ alkyl;

X is oxygen or sulfur; and

M is an alkaline earth metal cation.

2. A process for reducing corrosion, plugging or fouling of olefin production and recovery equipment while deactivating active catalyst species in an olefin polymer stream exiting a polymerization reactor and neutralizing catalyst residues, said process comprising adding to the olefin polymer stream a catalyst deactivator and an alkaline earth metal salt of a phosphoric- or phosphonic acid and subsequently recovering the resulting polymer product;

wherein the phosphoric- or phosphonic acid salt corresponds to the formula:

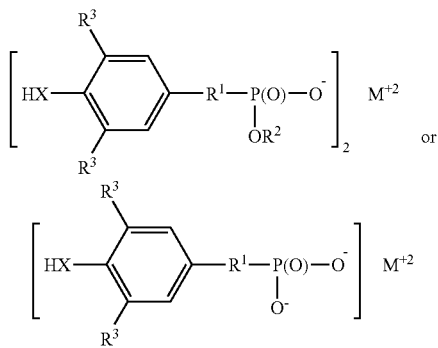

wherein, $R^1$ is a divalent oxygen or hydrocarbylene group;

$R^2$ is $C_{1-4}$ alkyl;

$R^3$, individually each occurrence, is $C_{1-20}$ alkyl;

X is oxygen or sulfur; and

M is an alkaline earth metal cation.

3. A process according to any one of claim 1 or 2, wherein the deactivating agent and alkaline earth metal salt of a phosphoric- or phosphonic acid are combined prior to addition to the olefin polymer stream, and thereafter said combination is mixed with the olefin polymer stream.

4. The process according to any one of claims 1-3 wherein calcium bis(((3,5-bis(1,1-dimethylethyl)-4-hydroxyphenyl) methyl)ethylphosphonate) is added to the polymer stream.

5. The process according to any one of claims 1-3 wherein the olefin polymer is a homopolymer of ethylene or propylene or a copolymer of ethylene with one or more $C_{3-10}$ α-olefins prepared by use of a transition metal containing catalyst composition.

6. The process according to any one of claims 1-3 wherein the catalyst composition comprises halogen, a transition metal of Groups 3-6 of the Periodic Table of Elements, and optionally magnesium and/or an alkoxide; and an organoaluminum cocatalyst.

7. The process according to any one of claims 1-3 wherein an aqueous solution containing from 0.1 to 60percent phosphoric- or phosphonic acid salt is employed as the catalyst deactivator and neutralizer.

8. The process according to any one of claims 1-3 wherein the polymer stream, catalyst deactivator and alkaline earth metal salt are mixed by passing through one or more static mixing elements prior to recovery of the polymer.

9. The process according to any one of claims 1-3 wherein the polymer is recovered by devolatilization.

* * * * *